US010068484B2

(12) United States Patent
Kadry

(10) Patent No.: US 10,068,484 B2
(45) Date of Patent: Sep. 4, 2018

(54) PARKING ASSISTING DEVICE

(71) Applicant: Reyad Kadry, Deerborn, MI (US)

(72) Inventor: Reyad Kadry, Deerborn, MI (US)

(73) Assignee: Garden Technologies LLC, Dearborn, MI (US)

( * ) Notice: Subject to any disclaimer, the term of this patent is extended or adjusted under 35 U.S.C. 154(b) by 0 days.

(21) Appl. No.: 15/413,286

(22) Filed: Jan. 23, 2017

(65) Prior Publication Data

US 2018/0211538 A1 Jul. 26, 2018

(51) Int. Cl.
*B60Q 1/48* (2006.01)
*G08G 1/16* (2006.01)
*E04H 6/42* (2006.01)

(52) U.S. Cl.
CPC ............. *G08G 1/168* (2013.01); *E04H 6/426* (2013.01)

(58) Field of Classification Search
CPC .... B62D 15/027; B62D 15/028; G08G 1/146; G08G 1/168; E04H 6/426
USPC ............................................. 340/932.2, 436
See application file for complete search history.

(56) References Cited

U.S. PATENT DOCUMENTS 4,341,488 A * 7/1982 Ryan ....................... E01F 9/627 340/932.2
4,433,636 A 2/1984 Crouch
5,231,392 A * 7/1993 Gust ....................... E04H 6/426 340/932.2
5,617,087 A * 4/1997 Scott ........................ B60Q 1/48 340/932.2
6,563,431 B1 * 5/2003 Miller, Jr. ............... E04H 6/426 340/932.2
6,850,172 B2 * 2/2005 Becka .................... G08B 17/10 340/932.2
2005/0099821 A1 * 5/2005 Potter ...................... B60Q 1/48 362/548
2005/0156758 A1 * 7/2005 Gilliss .................... G08G 1/164 340/932.2
2007/0046500 A1 * 3/2007 Herbert ................... G01S 7/497 340/932.2
2009/0146843 A1 * 6/2009 Dobson ................. E05D 15/165 340/932.2
2016/0371983 A1 * 12/2016 Ronning ................ G08G 1/168
2017/0106793 A1 * 4/2017 Kumar ................... B60Q 9/005

OTHER PUBLICATIONS

Shea, 5 Garage Parking Aids That Will Put You in Your Place, allgaragefloors.com, May 31, 2016, http://allgaragefloors.com/best-garage-parking-aids/.
Neo Products Usa Inc, Amazon.com, Jul. 27, 2015, https://www.amazon.com/Smart-Parking-Garage-Flashing-Warning/dp/B012POAXYG/ref=pd_sim_263_13?_encoding=UTF8&pd_rd_i=B012POAXYG&pd_rd_r=62CRF73FH6459A2WSX9W&pd_rd_w=IVfrw&pd_rd_wg=lcogK&psc=1&refRID=62CRF73FH6459A2WSX9W.

* cited by examiner

*Primary Examiner* — Thomas Mullen
(74) *Attorney, Agent, or Firm* — Lynch LLP; Sean Lynch

(57) ABSTRACT

Systems, methods, and devices of parking assisting devices. Two variations are disclosed: one that is floor-based and one that is suspended from a support structure. Devices of the inventive subject matter are configured to detect a tilt condition, a contact condition, or both, indicating that a vehicle has contacted the device and is positioned be parked safely. Upon detecting a tilt condition, a contact condition, or both, the device generates an alert to inform the driver that the vehicle should be stopped and parked. These devices can be wirelessly enabled, for example, to be accessed to determine whether a car is in a garage.

18 Claims, 5 Drawing Sheets

PARKING ASSISTING DEVICE

FIELD OF THE INVENTION

The field of the invention is parking assistance.

BACKGROUND

The background description includes information that may be useful in understanding the present invention. It is not an admission that any of the information provided in this application is prior art or relevant to the presently claimed invention, or that any publication specifically or implicitly referenced is prior art.

Past attempts to develop improved parking assistance devices have failed to account for advances in technology. The most common parking assistant device is simply a tennis ball dangling from a string: when a person pulls their car into a garage, the driver stops when the tennis ball contacts the windshield. This utterly fails to account for improvements in technology that can create a more robust system using low-cost electronics.

Some have attempted to develop new solutions by creating, for example, products that rest on the floor of a parking space. These floor-bound solutions include a bump that, when the vehicle contacts the bump, the driver knows that the vehicle is properly positioned (i.e., it is safe to close a garage door).

Others have developed mechanical improvements to the classic string and tennis ball implementation. For example, U.S. Pat. No. 4,433,636A to Crouch describes a dangling tennis ball device that, instead of dangling the ball from a ceiling, the ball dangles from a support structure that is integral to the device. The device is floor based, but nevertheless is a purely mechanical solution. Crouch therefore fails to take advantage of electronics.

In some instances, electronics are incorporated into a device that rests on a floor. In one example, a stop sign on an elongated pole lights up when a vehicle contacts the pole. In this device, the lights are activated by a switching mechanism, where the switch is activated by a vehicle's bumper when it contacts the pole. But this device fails to appreciate advances in electronics technology that can produce much more reliable devices.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

Thus, there is still a need in the art for an improved parking assistance device.

SUMMARY OF THE INVENTION

The present invention provides apparatuses, systems, and methods related to a parking assistance device.

In one aspect of the inventive subject matter, a device to assist with parking a vehicle that is set on a floor is contemplated. The device includes several components. It has an elongated component having a rod coupled with a spring (e.g., a coil spring or a flat spring). It includes a base coupled with the elongated component. A bumper component is coupled with the other end of the elongated component. A sensor (e.g., an accelerometer or a gyroscope) to detect a tilting condition of the bumper component caused by contact with a vehicle is included in the device. A light source (e.g., a plurality of LEDs) that is connected to the sensor is configured to activate upon detection of the tilting condition.

In some embodiments, the bumper component includes a rubber to prevent damage to the vehicle. The bumper component can alternatively or additionally include a fabric to prevent damage to the vehicle. These features can apply to any embodiment of the device.

In some embodiments, the light source is configured to project an image onto a surface. The image can be, for example, the word "STOP" or an image of a red octagon—a shape commonly associated with stop signs).

In another aspect of the inventive subject matter, a suspended device to assist with parking a vehicle is contemplated. It includes a support to suspend the device, a bumper component coupled with the support (e.g., a thread), a sensor (e.g., an accelerometer or a gyroscope) to detect a tilting condition of the bumper component caused by contact with the vehicle, and a light source that is coupled with the sensor and configured to activate upon detection of the tilting condition.

In some embodiments, the bumper component includes a through hole for the support. The through hole can be positioned to discourage free rotation about an axis of the bumper component. In other embodiments, the bumper component includes a through hole for the support that is positioned to facilitate free rotation about an axis of the bumper component (e.g., a through hole that passes through the center of mass of the bumper component). The support can couple with a support structure at two points of contact.

Various objects, features, aspects and advantages of the inventive subject matter will become more apparent from the following detailed description of preferred embodiments, along with the accompanying drawing figures in which like numerals represent like components.

DETAILED DESCRIPTION

Figure 3:
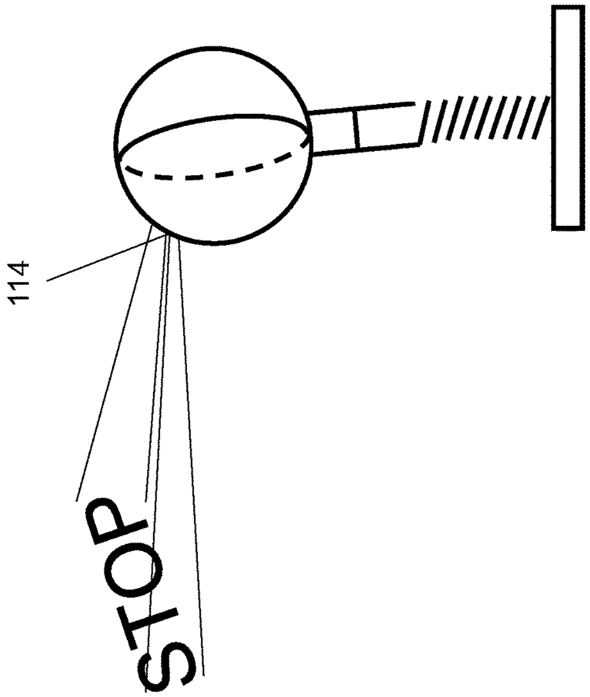
FIG. 3 shows wording projected from a floor-bound parking assisting device in a tilt condition.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed considering the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Parking assisting devices of the inventive subject matter are used to make it easier for people to park their vehicles especially in a garage that has limited space. If the vehicle is not pulled far enough forward, then the rear bumper of the vehicle can be damaged by the garage door as it closes. On the other hand, if the vehicle is pulled too far forward, then the front bumper can be damaged when the vehicle contacts the back of the garage (or some other obstacle such as a workbench, bicycle, etc.). Although solutions have been developed in the past, those solutions are lacking. Thus, a new parking assisting device has been developed and is described below in detail.

Figure 1:
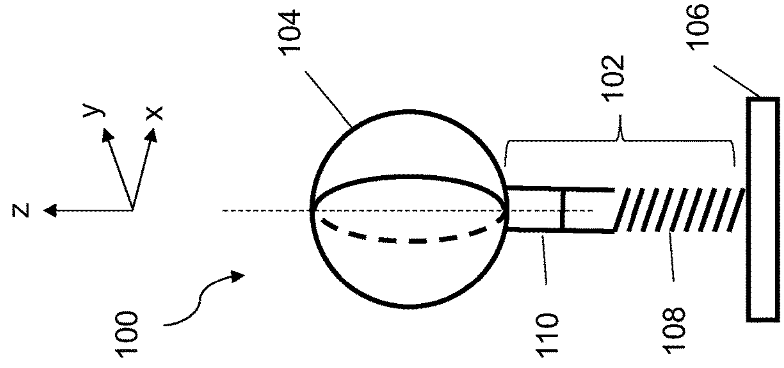
FIG. 1 is a floor-bound embodiment of a parking assisting device.

FIG. 1 shows an embodiment of a new parking assisting device 100 that is designed to rest on a floor. It includes three main components: a stem 102, a bumper component 104, and a base 106. The stem 102 can include a spring 108 and a rod 110 (the order these are arranged in is not critical), or in some embodiments just a spring or just a rod. The bumper component 104 can be any shape (though it is shown as spherical in the figures), and it can house the electronics, the sensors, or both. The base 106 can alternatively house all necessary electronics, the sensors, or both.

Put together, the base 106 rests on a floor of, for example, a garage, the stem 102 couples to the base 106, and the bumper component 104 couples to the stem 102. The base 106, in some embodiments, provides housing for the requisite electronic components for the device. In some embodiments, the base 106 can be weighted (e.g., 1-5 lbs., 5-10 lbs., 10-15 lbs., 15-20 lbs.). By weighting the base 106, the parking assisting device 100 is less likely to move when a vehicle contacts it or when accidental contact occurs (e.g., from a person or another object bumping into it).

Alternatively, or additionally, the base 106 can include fastening components to hold the device 100 to a floor. For example, the base 106 can include an adhesive on the bottom, or it can include screw holes that can allow the base to be held to a floor by screws or nuts and bolts. In other embodiments, the base 106 can include rubber (e.g., as feet on the bottom of the base 106 or along the entire bottom surface of the base 106) or another material having a high coefficient of static friction (relative to, for example, a flat metal base or a flat plastic base) such as a foam or textured plastic (e.g., a textured plastic). A material on the underside of the base can help to prevent unwanted sliding, ensuring proper functioning of the device 100.

Figure 2:
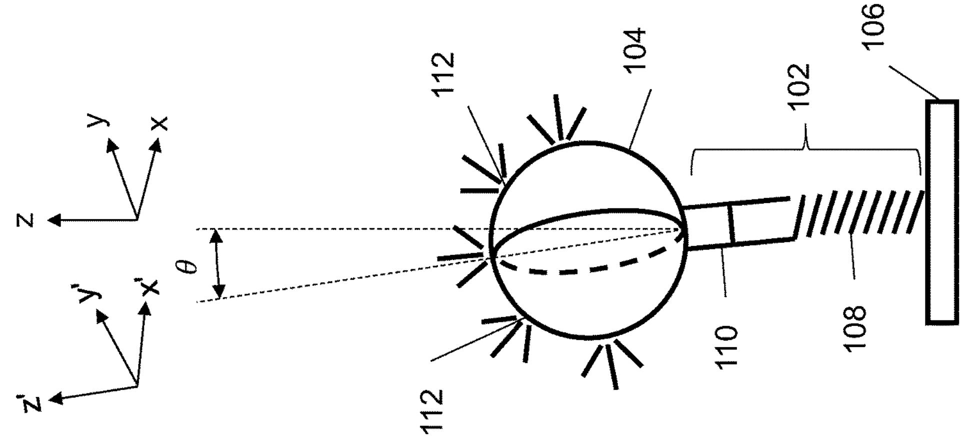
FIG. 2 shows lights on a floor-bound parking assisting device when in a tilt condition.

The embodiment shown in FIGS. 1-3 have both a spring 108 and a rod 110. In some embodiments, the rod 110 can be designed to change lengths. Length changes in the rod 110 can be effectuated by a variety of mechanisms. Rod 110 as seen in FIG. 1 can be interpreted to be telescopic (e.g., having two segments whereby one segment fits into the other and is held in place by, for example, a pin that enables adjustment of the length of the rod 110). Thus, the height of the bumper component 104 (as measured from the ground) can be adjusted to accommodate different vehicles (e.g., lower for shorter vehicles and higher for taller vehicles).

In some embodiments, the length of the stem 102 can be changed because rod 110 is segmented. In a segmented rod 110, additional segments can be added or taken away to affect the length of the stem 102. As seen in FIGS. 1-3, rod 110 is drawn as two segments, which can be interpreted to represent two different segments with the ability to separate to allow for the addition of one or more segments. The rod 110 portion of the stem 102 can be made from several materials including, for example, metals, plastics, alloys, composites, etc.

Spring 108 as seen in FIGS. 1-3 can be interpreted as a coil spring, but other spring types are also contemplated. For example, a cantilever spring could be implemented (e.g., a flat piece of material that is designed to bend when encountering the range of forces that the device 100 would endure when a vehicle contacts the bumper component 104). Although depicted as a coil spring in FIGS. 1-3, the spring 108 should be interpreted to encompass all suitable springs now known in the art.

Including a spring 108 in the device 100 helps to prevent the device 100 from sliding along the floor when a vehicle contacts it. Similar devices having a purely rigid stem 102 are more likely to tip over or slide across a floor instead of remaining in place when a vehicle contacts the bumper component 104. If a device tips over or slides, then the device 100 will be out of place and unable to serve its intended purpose. The spring can be made from several materials include, for example, metals, plastics, alloys, or composites.

In other embodiments, parking assisting devices of the inventive subject matter can be suspended from above (e.g. from a ceiling or other support structure). FIGS. 4-8 show embodiments of the device that are suspended from above. As shown in the figures, embodiments of the device that are suspended from above have no need for a rod, spring, or base component and instead the electronic components are contained entirely within the bumper component.

Figure 4:
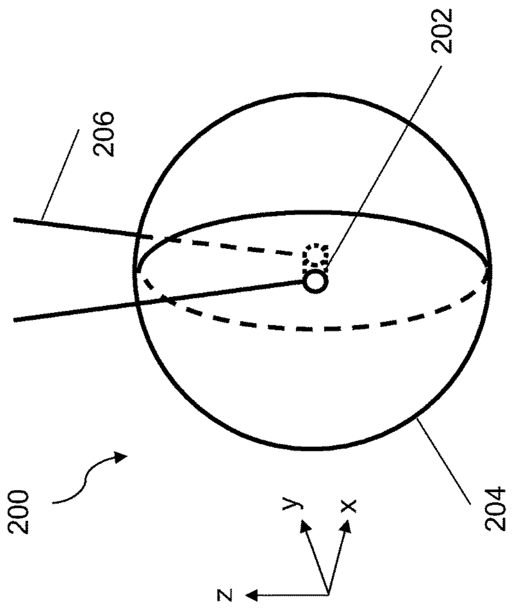
FIG. 4 shows a suspended version of a parking assisting device.
Figure 5:
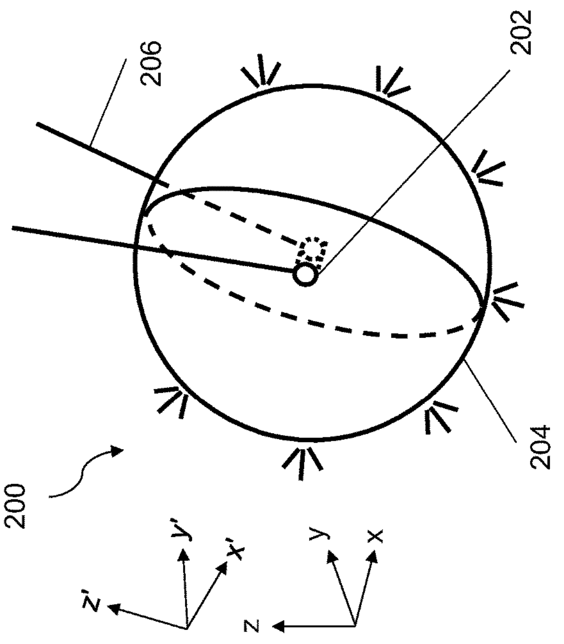
FIG. 5 shows lights on a suspended version of a parking device in a tilt condition.
Figure 6:
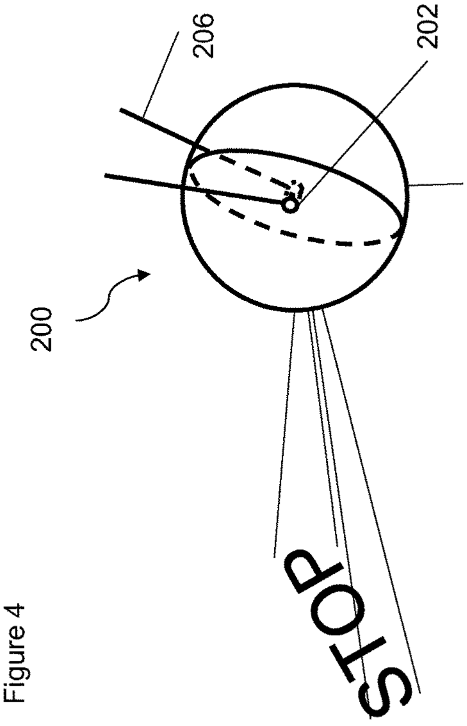
FIG. 6 shows wording projected from a suspended parking assisting device in a tilt condition.

In FIGS. 4-6, the device 200 is suspended via a through hole 202 that runs through the center of mass of the device 200. Suspending the device 200 by the bumper component 204 through its center of mass allows the device 200 to freely rotate about that axis. The use of a through hole that extends through the center of mass and using two separate attachment points for the support component that rights through the through hole also prevents the device 200 from rotating about its z-axis (as defined by the Cartesian coordinate system accompanying, for example, FIGS. 4-5 and 7-8).

The device 200 can be suspended by, for example, a thread 206 that runs through the through hole 202. The thread 206 can be made from a fabric, a plastic filament (e.g., a single strand or a woven thread), or even a rigid metallic component. The thread can couple with the support structure at different locations so that the device 200 is discouraged from rotating about the z-axis.

Figure 7:
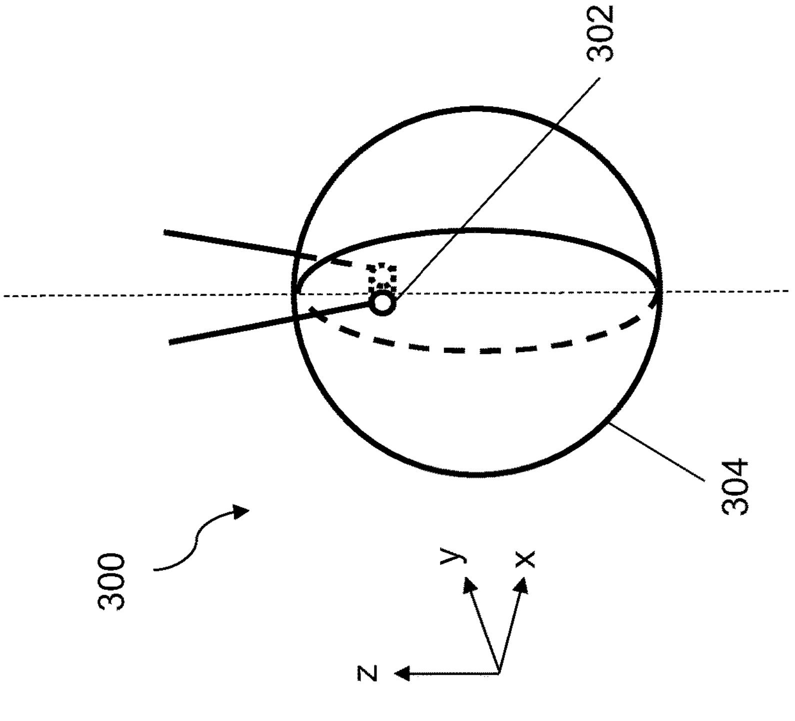
FIG. 7 shows another embodiment of a suspended parking assisting device.
Figure 8:
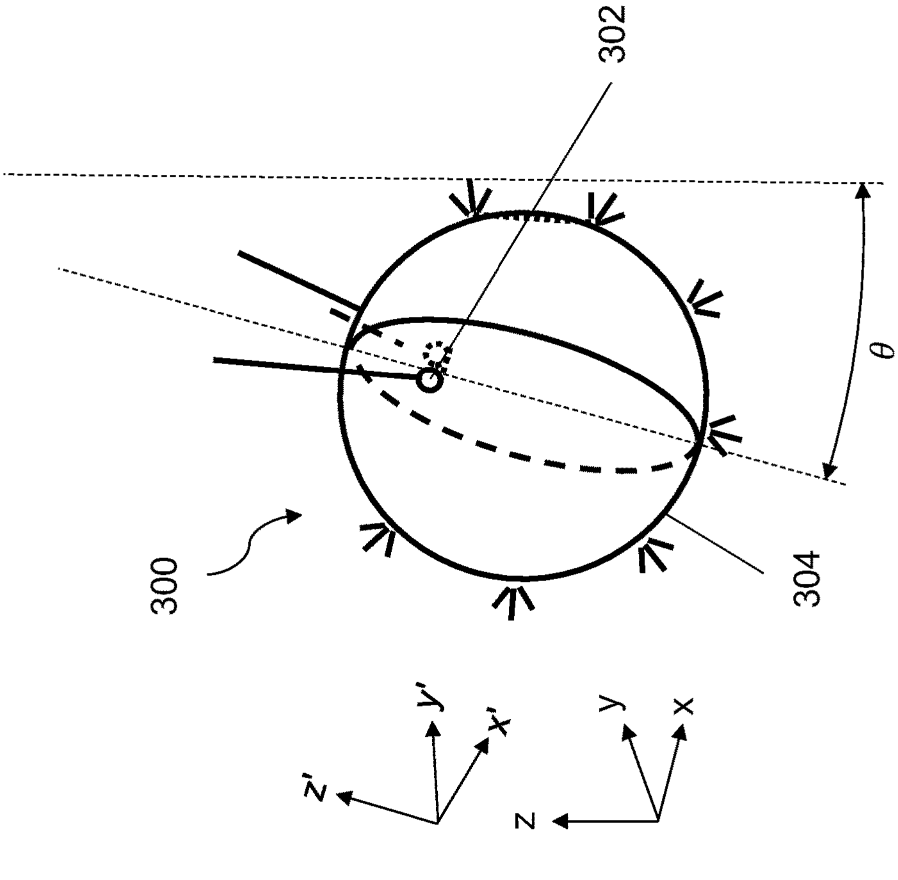
FIG. 8 shows another embodiment of a suspended parking assisting device in a tilt condition.

FIGS. 7-8 show an alternative embodiment of a suspended parking assisting device 300 that is suspended by a through hole 302 that is not coincident with the center of mass of the device 300. Embodiments like that shown in FIGS. 7-8 are designed to prevent free rotation about the axis of the through hole. This can be useful in embodiments of the device having a light source (or sources) that are designed to project an image or lettering in a direction that relies on a consistent orientation of the device (like the projection of the word "STOP" as seen in FIGS. 3 & 6).

Figure 10A:
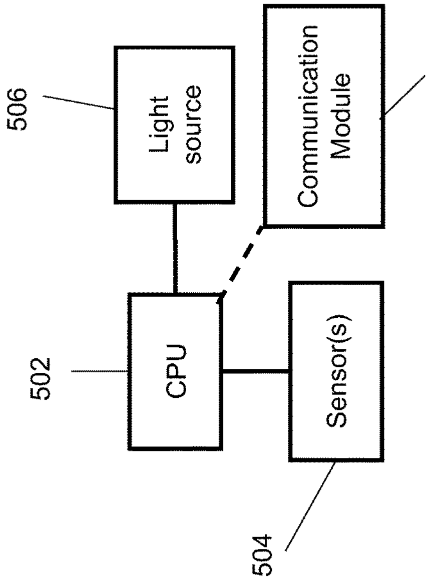
FIG. 10*a* is a schematic of electronic components for use in parking assisting devices.
Figure 10:
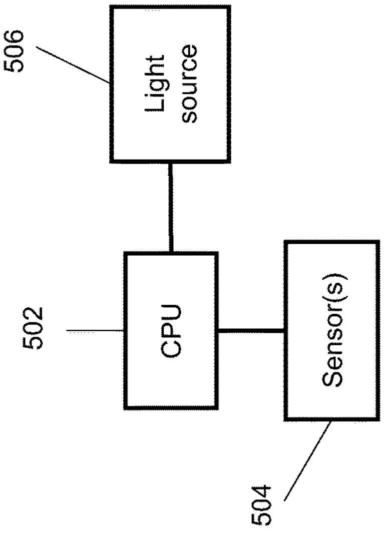
FIG. 10*b* is a schematic of electronic components for use in parking assisting devices that includes an optional communication module.

Parking assisting devices of the inventive subject matter all include electronics. FIG. 10 is a schematic of electronics that can be included in parking assisting devices of the inventive subject matter, and FIG. 10*a* shows a schematic that includes an optional communications module. Thus, parking assisting devices of the inventive subject matter include at least a CPU 502, a sensor 504, and a light source 506. Devices would also include a power source (e.g., batteries, a plug, or both—not pictured).

Electronic components (e.g., 502, 504, 506, and optionally 508) could be housed in the same or different parts of a parking assisting device. For example, in the embodiment shown in FIGS. 1-3, the electronic components can be entirely enclosed in the bumper component 104. Alternatively, the electronic components can be enclosed partly within the base 106 and partly within the bumper component 104. In embodiments where the electronic components are split up into different parts of the parking assisting device, the sensor could be housed within the bumper component 104 and the other electronics housed within the base 106.

Embodiments of the device can include more than one sensor. Contemplated sensors include, for example, an accelerometer, a gyro, or both. Sensors are used to detect whether to generate an alert (e.g., activation of one or more light sources to create a visual cue indicating that a vehicle has contacted the bumper component of an embodiment of the parking assisting device as seen in, for example FIGS. 2 and 3). FIG. 10 illustrates the process of triggering parking assisting devices described in this application.

The first step of detecting a tilt condition is accomplished using a sensor. FIG. 1 shows a parking assisting device 100 in a rest position, while FIG. 2 shows a parking assisting device 100 in a tilt condition. After detecting a tilt condition, an alert is generated. FIG. 2 shows a parking assisting device 100 generating an alert with light sources 112 activated on its surface. When in a tilt condition, the sensor(s) located within the bumper component 104 detect that the bumper component 104 is no longer oriented in its rest position. FIG. 3 shows an alternative alert using a light source 114 to project a word (e.g., STOP).

In FIGS. 1-2, 4-5 and 7-8, the tilted Cartesian coordinates (expressed as x', y', and z') represent the rotated reference frame of a sensor (or sensors) that is fixed in relation to the bumper component. The Cartesian coordinate system with the coordinates x, y, and z (non-prime) represents a reference frame against which the tilted (prime) Cartesian coordinates are measured (e.g., when the device is at rest, the x, y, and z axes are aligned with the x', y', and z' axes). While these reference frames are useful for this discussion, the nature of reference frames is such that any starting and ending reference frame can be just as useful, if not more computationally challenging to use. Thus, a "tilt condition" is a condition in which the bumper component (e.g., 104, 204, or 304) of an embodiment of the parking assisting device has experienced a rotation about one or both of the x and y axes relative to a starting reference frame.

Rotation can also be accompanied by translation or acceleration experienced along various axes as the bumper component moves from one position to another as a vehicle's bumper contacts the bumper component. Although one or more sensors would detect all or many of these types of movements, a CPU can be programmed to differentiate between non-triggering sensor readings and triggering sensor readings so that the device only reacts to the types of rotation that indicate a vehicle has contacted the bumper component. For example, one type of false positive can occur when a user accidentally kicks or nudges the bumper component. This type of false positive can be filtered out by ensuring that oscillating movements do not trigger the device.

In some embodiments, the device includes an accelerometer. Rotation can be detected using an accelerometer by detecting whether a component of gravitational acceleration in the x' and/or y' directions exceeds a certain threshold, which indicates that gravity is no longer aligned primarily with the z' axis. In embodiments using a gyro, rotation about both the x and y axes can be measured directly. Total rotation measured as an angle between z' and z is expressed as θ in FIGS. 2 & 8. Basic trigonometry can be used to determine a rotation of the bumper component's z' axis from the initial z axis in many ways outside of just those discussed in this application.

A threshold amount of rotation (e.g., θ, either directly measured by a gyro or computed using acceleration data) sufficient to trigger an alert can be set by a user, or it can be assigned a default setting upon manufacture and programming of the unit. Regardless, to avoid false positives for detection of tilt conditions, the device can be programmed such that, for example, only certain threshold angles trigger a tilt condition (e.g., an angle off the z-axis of greater than 2, 3, 4, 5, 6, 7, 8, 9, 10, 11, 12, 13, 14, or 15 degrees is sufficient to trigger a tilt condition).

In other embodiments, the device includes a contact-based sensor (e.g., a pressure sensor). When a vehicle contacts a bumper component of a parking assisting device that has a contact-based sensor mounted to its surface, the contact-based sensor generates a signal indicating that something has contacted the bumper component.

Figure 9:
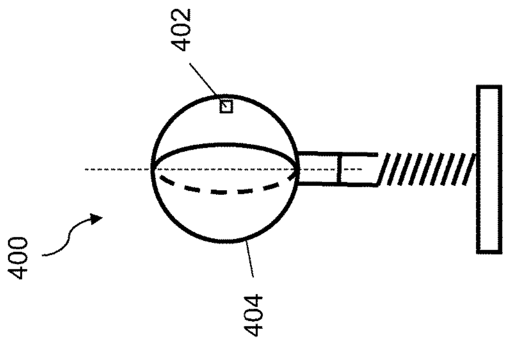
FIG. 9 is a floor-bound embodiment of a parking assisting device having a contact sensor on the surface of the bumper component.

FIG. 9 shows an embodiment of a parking assisting device 400 having a contact-based sensor 402 on the surface of the bumper component 404. The contact-based sensor 402 can be used in conjunction with other sensors, or as a standalone sensor for the device 400. For example, a contact sensor 402 (or a plurality of contact sensors) can detect contact whether a vehicle's bumper either in a binary fashion or based on a threshold pressure reading, depending on the type of contact-based sensor 402.

In embodiments having both a contact sensor and an accelerometer, a gyro, or both, the contact sensor can help to prevent false positives by requiring detection of consistent contact combined with a tilt condition before an alert will be generated. This will prevent false positives that could be generated by an accidental kick or nudge by a person, pet, or object. In some embodiments, the contact sensor can be positioned and dimensioned on the surface of the bumper component so that only contact on a specific location on the bumper (e.g., the location where a vehicles bumper would contact the contact sensor 402 on the surface of the bumper component 404 as seen on the device 400 in FIG. 9).

In other embodiments, the contact sensor could cover a much larger surface area of a bumper component (e.g., up to the entire surface of the bumper component could be a contact sensor) and perform the same false positive prevention.

An example of a device having a binary contact sensor is one where the contact sensor detects whether there is contact or no contact, but not any degree of force or pressure in between those states. If the contact sensor detects contact, then the CPU in the device determines whether an alert should be generated (e.g., activating the light source). Generation of an alert can be timed to prevent false positives from, for example, accidental contact. For example, an alert can be generated after an amount of time has passed (e.g., greater than 0.03, 0.04, 0.05, 0.06, 0.07, 0.08, 0.09, 0.1, 0.2, 0.3, 0.4, and 0.5 seconds).

An example of a device implementing a pressure sensor is one where the pressure sensor detects an amount of pressure (or force) that the surface of the bumper component is experiencing to determine whether a triggering contact with a vehicle has occurred. Pressure sensors, unlike contact sensors discussed above, are not binary and instead measure varying levels of pressure (or force). The CPU of a device having a pressure sensor can track an amount of pressure and a duration of pressure to determine whether to generate an alert. If the pressure detected by the pressure sensor exceeds some threshold amount (e.g., 0.5, 1, 1.5, 2, 2.5, 3, or 3.5 $lbs./in^2$), then an alert would be generated.

In some embodiments, as illustrated in FIG. 10*a*, parking assisting devices of the inventive subject matter can include a communications module 508. The communications module can include, for example, a wireless communication component (e.g., Bluetooth, WiFi, NFC, RFID, or any other wireless protocol). Wireless communication can be implemented such that the device is connected to a local area network or the internet (or both), making the device accessible from any computing device that is connected to the same local area network or that is configured to access the parking assisting device via internet connection.

Information about the status of a device can be transmitted via the wireless communication module. For example, if a device detects that a vehicle has parked, it can broadcast that status via its wireless communication module so that a person with access to that device's status could check to see if a car is parked in the garage (or vice versa, to detect if the garage is empty before opening it to park). This feature can be useful, for example, to remotely check to see if someone has arrived home yet. If a parent doesn't want to get out of bed to see if their child has arrived home, they can check the status of the parking assisting device to see if a car is parked in the garage.

In some embodiments, a proximity sensor can be included in the parking assisting device (e.g., in conjunction with one or more sensors to detect a tilt condition and/or a contact sensor). The proximity sensor can detect the presence of a vehicle even if contact is not made. This can be useful when determining whether a vehicle has been parked in a garage or space when, for example, a vehicle has been parked incorrectly (i.e., parked without contacting the parking assisting device). The proximity sensor can be, for example, an optical sensor. Some contemplated optical sensors are cameras, video cameras, infrared sensors, ultraviolet sensors, etc. A user could remotely check on the device to see if a vehicle has been parked by accessing the proximity sensor and, for example, looking at a live-feed of their garage (or any other output resulting from the proximity sensor that has been implemented).

Figure 11:
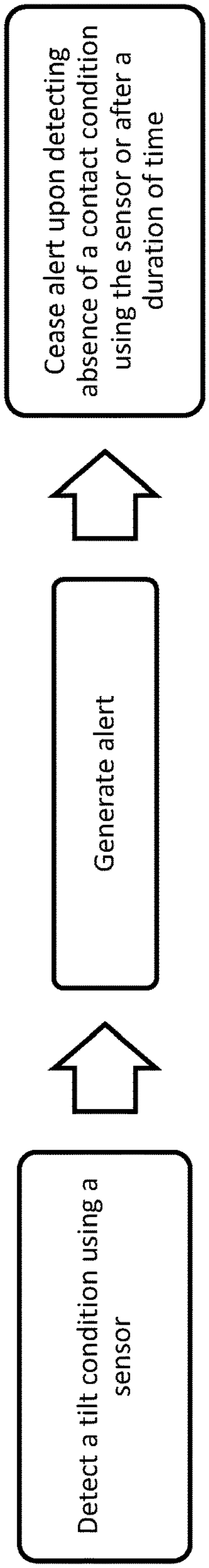
FIG. 11 is a flow chart of events for parking assisting devices.

FIG. 11 is a flowchart that gives visual context to the functions of devices of the inventive subject matter. In a first step, the device detects a tilt condition using a sensor (or plurality of sensors as discussed above). In a second step, an alert is generated (e.g., activation of a light source). And in a third step, the alert stops after either the alert condition is no longer detected or after some duration of time. Ceasing an alert after a duration of time (e.g., 1-15 seconds) reduces power consumption. The duration of the alert can be set by the user or pre-programmed, or both. In addition, it is not necessary to maintain an alert the entire time a tilt condition is detected because once a car is parked and the driver has brought the car to a stop, an alert is no longer needed.

Thus, specific apparatuses, systems, and methods of parking assisting devices have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context.

The terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A suspended device to assist with parking a vehicle, comprising:

a support to suspend the device;

a bumper component coupled with the support;

wherein the bumper component further comprises a through hole for the support, wherein the through hole is positioned to discourage free rotation about an axis of the bumper component;

a sensor to detect a tilting condition of the bumper component caused by contact with the vehicle; and at least one light source communicatively coupled with the sensor and configured to activate upon detection of the tilting condition.

2. The device of claim 1, wherein the support is configured to couple with a structure at two points of contact.

3. The device of claim 1, wherein the sensor is an accelerometer.

4. The device of claim 1, wherein the sensor is a gyroscope.

5. The device of claim 1, wherein the bumper component comprises a rubber material to prevent damage to the vehicle.

6. The device of claim 1, wherein the bumper component comprises a fabric to prevent damage to the vehicle.

7. The device of claim 1, wherein the at least one light source comprises a plurality of LEDs.

8. The device of claim 1, wherein the at least one light source is configured to project an image onto a surface.

9. The device of claim 1, wherein the support comprises a thread.

10. A suspended device to assist with parking a vehicle, comprising:

a support to suspend the device;

a bumper component coupled with the support;

wherein the bumper component further comprises a through hole for the support, wherein the through hole is positioned to facilitate free rotation about an axis of the bumper component;

a sensor to detect a tilting condition of the bumper component caused by contact with the vehicle; and at least one light source communicatively coupled with the sensor and configured to activate upon detection of the tilting condition.

11. The device of claim 10, wherein the support is configured to couple with a structure at two points of contact.

12. The device of claim 10, wherein the sensor is an accelerometer.

13. The device of claim 10, wherein the sensor is a gyroscope.

14. The device of claim 10, wherein the bumper component comprises a rubber material to prevent damage to the vehicle.

15. The device of claim 10, wherein the bumper component comprises a fabric to prevent damage to the vehicle.

16. The device of claim 10, wherein the at least one light source comprises a plurality of LEDs.

17. The device of claim 10, wherein the at least one light source is configured to project an image onto a surface.

18. The device of claim 10, wherein the support comprises a thread.

* * * * *